United States Patent
Lee et al.

(10) Patent No.: US 12,265,521 B1
(45) Date of Patent: Apr. 1, 2025

(54) METHODS AND SYSTEMS FOR AUTHORIZATION RATE GRADUAL DEGRADATION DETECTION

(71) Applicant: Stripe, Inc., South San Francisco, CA (US)

(72) Inventors: Hung Fuk Lee, Bothell, WA (US); Brooke Bane-Herzog, New York, NY (US); Jacob Meltzer, San Francisco, CA (US); Ross Kravitz, Philadelphia, PA (US)

(73) Assignee: Stripe, Inc., South San Francisco, CA (US)

( * ) Notice: Subject to any disclaimer, the term of this patent is extended or adjusted under 35 U.S.C. 154(b) by 0 days.

(21) Appl. No.: 18/523,323

(22) Filed: Nov. 29, 2023

(51) Int. Cl.
G06F 16/00 (2019.01)
G06F 16/23 (2019.01)
G06F 16/901 (2019.01)

(52) U.S. Cl.
CPC ...... G06F 16/2365 (2019.01); G06F 16/9024 (2019.01)

(58) Field of Classification Search
None
See application file for complete search history.

(56) References Cited

U.S. PATENT DOCUMENTS

| | | | | |
|---|---|---|---|---|
| 7,716,077 B1* | 5/2010 | Mikurak | ............ | G06Q 10/0631 705/7.12 |
| 8,032,409 B1* | 10/2011 | Mikurak | ............ | G06Q 30/00 705/14.39 |
| 9,892,293 B1* | 2/2018 | Wade | ............ | G06F 21/86 |
| 10,127,409 B1* | 11/2018 | Wade | ............ | G06F 21/75 |
| 2007/0087756 A1* | 4/2007 | Hoffberg | ............ | G06Q 10/06375 455/450 |
| 2012/0089410 A1* | 4/2012 | Mikurak | ............ | G06Q 10/00 705/1.1 |
| 2013/0110766 A1* | 5/2013 | Promhouse | ............ | G06F 16/2468 707/607 |

(Continued)

OTHER PUBLICATIONS

Burgess, Mark. "Probabilistic anomaly detection in distributed computer networks." Science of Computer Programming 60, No. 1 (2006): 1-26. (Year: 2006).*

(Continued)

*Primary Examiner* — Farhan M Syed
(74) *Attorney, Agent, or Firm* — Foley & Lardner LLP

(57) ABSTRACT

Described herein are systems and methods to use modeling techniques to identify gradual changes in various metrics identified as a result of analyzing an aggregated transaction dataset. In one method, a computer model dynamically slice the data using an attribute, calculates an entropy value for using a rolling time window, and uses the entropy value to identify anomalous behavior. The model may use information gain to determine whether to further segmented the data slice into smaller data slices. The model may iteratively slice and analyze the data until a data slice corresponding to the root cause is determined. The model may then traverse the hierarchy of data slices and combine the data slices until an optimized combined data slice. The model may train a machine learning component, such as a booted tree algorithm, to optimize its traversal of the hierarchy of data slices.

20 Claims, 12 Drawing Sheets

(56) References Cited

U.S. PATENT DOCUMENTS

| | | | |
|---|---|---|---|
| 2016/0019267 A1* | 1/2016 | Kala | G06F 16/2465 |
| | | | 707/754 |
| 2018/0173754 A1* | 6/2018 | Kumar | G06F 16/24535 |
| 2019/0034308 A1* | 1/2019 | Che | G06F 11/0766 |
| 2019/0370368 A1* | 12/2019 | Kim | G06F 16/27 |
| 2022/0172235 A1* | 6/2022 | Iwashita | G06F 17/40 |
| 2024/0265111 A1* | 8/2024 | Lee | G06Q 20/40 |

OTHER PUBLICATIONS

Fan, Xin, Chenlu Li, Xiaoru Yuan, Xiaoju Dong, and Jie Liang. "An interactive visual analytics approach for network anomaly detection through smart labeling." Journal of Visualization 22 (2019): 955-971. (Year: 2019).*

Patcha, Animesh, and Jung-Min Park. "Network anomaly detection with incomplete audit data." Computer Networks 51, No. 13 (2007): 3935-3955. (Year: 2007).*

Probabilistic anomaly detection in distributed computer network (Year: 2006).*

* cited by examiner

| Purpose | Original Problem | Mapping to Change | Information Problem | |
|---|---|---|---|---|
| Highlight Degradation | $A_c = 0.7, A_p = 0.9, N_c = 10$ | $\max(A_c - A_p, 0) \times N_c$ | ○○○○○ ●●○○○ | 840 |
| Highlight Improvement | $A_c = 0.8, A_p = 0.4, N_c = 10$ | $\max(A_p - A_c, 0) \times N_c$ | ○○○○○ ●●●●○ | 850 |
| Highlight Both Direction | $A_c = 0.6, A_p = 0.9, N_c = 10$ | $|(A_c - A_p)| \times N_c$ | ○○○○○ ●●●○○ | 860 |

FIG. 3

╭─ 580
| Long-term auth rate degradation alert APP 5:11 PM
| The #auth-rate-team detected a -245.56 bps drop in auth rates for Vendor X
| (org_ELKnwqPCQPk9c3) between week starting April 24 -> week starting May 29 on the
| following dimensions:
|   gateway_conversation_request_avs_zip_postal=False,
|   card_dynamic_input_method=card_charge, gateway_conversation_request_mcc=7372
| Please investigate this drop on AuthDash to confirm whether this is expected behavior or
| requires intervention.

FIG. 5B

METHODS AND SYSTEMS FOR AUTHORIZATION RATE GRADUAL DEGRADATION DETECTION

TECHNICAL FIELD

This application relates generally to using computer modeling techniques to analyze data.

BACKGROUND

A resilient and reliable electronic payment system may require pathways to identify anomalous behavior and system failures. Most electronic payment systems rely on code paths, merchant/user inputs, card networks, issuing banks, and other processing infrastructure providers to facilitate transactions. System errors originating from these different components can cause authorization rate drops in certain subsets of transactions. When a component is experiencing an incident (e.g., declining transactions erroneously), the authorization rate drops, and users cannot collect revenue for a portion of their business, which is highly undesirable. Therefore, identifying that a component has been misconfigured or has been experiencing technical difficulties is important.

To identify anomalous declines (that could eventually lead to system failures or other technical issues), electronic payment systems monitor transaction data and analyze the monitored data to identify anomalous behavior. However, as electronic payment systems grow and build new features, the amount of data generated increases exponentially, where the data is typically high-dimensional and noisy. Monitoring and analyzing data at a high level (aggregated data produced by the electronic payment system) may not readily identify anomalous behavior because the anomalous behavior may be indicated in a subset of transactions that corresponds to a small portion of the data. Therefore, analyzing metrics at a high level may not lead to the efficient identification of anomalies. Moreover, segmenting the data into too many segments leads to the sparsity of the data amongst the segments, and analyzing data at a granular level may require additional processing of the segments, which may lead to detection delays, which is also undesirable, especially for electronic payment systems where fast detection of problems may be crucial.

Additionally, identifying anomalous data may be challenging if the anomalous behavior results in gradual changes/drops in various metrics, such as the authorization rate. In some examples, anomalous behavior may cause a sudden drop or sudden change in the overall (or local) authorization rate. However, some anomalous behavior may cause a smaller amount of drop that can be diluted among other non-anomalous behaviors or may create a gradual shift that is often undetected. Conventional data analytics methods typically use filtering and thresholding methods to identify these drops. However, these conventional methods have been proven to be ineffective because filtering and thresholding methods cannot readily identify gradual shifts in data.

SUMMARY

For the aforementioned reasons, there is a desire for methods and systems to provide a rapid and efficient analysis of pertinent segments of data that can be analyzed to identify anomalous behavior associated with an electronic payment system. As used herein, anomalous behavior may refer to anomalous authorization declines, such as having an unexpected number of declines vs approvals within a given slice of data (e.g., indicating a series of charges).

What is also desired in training a computer model to intelligently segment the data (also referred to herein as slicing the data) into different data slices exhibiting the anomalous behavior. Unlike conventional methods, the trained computer model discussed herein may slice the data without having a set of preconfigured attributes. Therefore, the data slicing can be performed automatically and dynamically depending on the anomalous behavior (instead of static slicing used by some conventional methods). The trained computer model discussed herein can iteratively combine various data slices, iteratively perform the anomalous detection protocols discussed herein, and re-combine the data slices until the largest data slice that exhibits an anomalous behavior is identified.

Because the computer model discussed herein does not use pre-configured or pre-determined attributes to slice the data, the computer model may dynamically slice the data without requiring high computing power and in a timely manner. For instance, because the computer model discussed herein does not perform every data-slicing permutation, the computer model is more efficient with regard to time and computing resources.

Using intelligent and dynamic data-slicing techniques, the computer model discussed herein can uncover whether a gradual drop in a metric (e.g., authorization rate) corresponds to anomalous behavior (e.g., communication errors, hardware faults, or unexpected software exceptions) or not (e.g., some declines are due to appropriate and legitimate reasons). Data slices that are suitably chosen can contain sufficient details to highlight unusual patterns and enable faster analysis due to their smaller data subset, requiring less computational resources. This capability is particularly valuable in payment systems, where swift and effective data analysis is crucial for the prompt identification and resolution of irregularities.

In an embodiment a method comprises identifying, by a server, aggregated transaction data corresponding to a set of attributes for a set of transactions, each attribute having one or more corresponding values; executing, by the server, a computer model that is configured to generate a first data slice using the aggregated transaction data and at least one attribute; calculate, for the first data slice, a first entropy value indicating a difference between one or more values corresponding to one or more attributes of the first data slice compared with a previous value for the same one or more attributes of the first data slice from a previous time window; when the first entropy value does not satisfy a threshold, generate a set of data slices using the first data slice; calculate a second entropy value for each data slice within the set of data slices; generate an information gain value based on the first entropy value and each second entropy value for the set of data slices; generate a second set of data slices using at least one data slice within the set of data slices that has an information gain value that satisfies an information gain threshold; when at least one data slice within the second set of data slices satisfies the threshold, iteratively combine the at least one data slice with another data slice of the second set of data slices to generate a combined data slice until the combined data slice has a respective entropy value that satisfies the threshold; and outputting, by the server, a notification of an anomaly associated with the aggregated transaction data comprising an identification of the combined data slice.

In another embodiment, a non-transitory machine-readable storage medium comprises computer-executable instructions stored thereon that, when executed by one or more processors, cause the one or more processors to perform operations comprising identify aggregated transaction data corresponding to a set of attributes for a set of transactions, each attribute having one or more corresponding values; execute a computer model that is configured to: generate a first data slice using the aggregated transaction data and at least one attribute; calculate, for the first data slice, a first entropy value indicating a difference between one or more values corresponding to one or more attributes of the first data slice compared with a previous value for the same one or more attributes of the first data slice from a previous time window; when the first entropy value does not satisfy a threshold, generate a set of data slices using the first data slice; calculate a second entropy value for each data slice within the set of data slices; generate an information gain value based on the first entropy value and each second entropy value for the set of data slices; generate a second set of data slices using at least one data slice within the set of data slices that has an information gain value that satisfies an information gain threshold; when at least one data slice within the second set of data slices satisfies the threshold, iteratively combine the at least one data slice with another data slice of the second set of data slices to generate a combined data slice until the combined data slice has a respective entropy value that satisfies the threshold; and output a notification of an anomaly associated with the aggregated transaction data comprising an identification of the combined data slice.

In another embodiment, a system comprises a processor configured to identify aggregated transaction data corresponding to a set of attributes for a set of transactions, each attribute having one or more corresponding values; execute a computer model that is configured to: generate a first data slice using the aggregated transaction data and at least one attribute; calculate, for the first data slice, a first entropy value indicating a difference between one or more values corresponding to one or more attributes of the first data slice compared with a previous value for the same one or more attributes of the first data slice from a previous time window; when the first entropy value does not satisfy a threshold, generate a set of data slices using the first data slice; calculate a second entropy value for each data slice within the set of data slices; generate an information gain value based on the first entropy value and each second entropy value for the set of data slices; generate a second set of data slices using at least one data slice within the set of data slices that has an information gain value that satisfies an information gain threshold; when at least one data slice within the second set of data slices satisfies the threshold, iteratively combine the at least one data slice with another data slice of the second set of data slices to generate a combined data slice until the combined data slice has a respective entropy value that satisfies the threshold; and output a notification of an anomaly associated with the aggregated transaction data comprising an identification of the combined data slice.

BRIEF DESCRIPTION OF THE DRAWINGS

Non-limiting embodiments of the present disclosure are described by way of example with reference to the accompanying figures, which are schematic and are not drawn to scale. Unless indicated as representing the background art, the figures represent aspects of the disclosure.

FIGS. 3-4 illustrate how a gradual detection monitoring system can segment and analyze different data slices, according to an embodiment.

FIG. 5A-8 illustrate various graphical user interfaces presented in an intelligent slice monitoring system, according to an embodiment.

DETAILED DESCRIPTION

Figure 1:
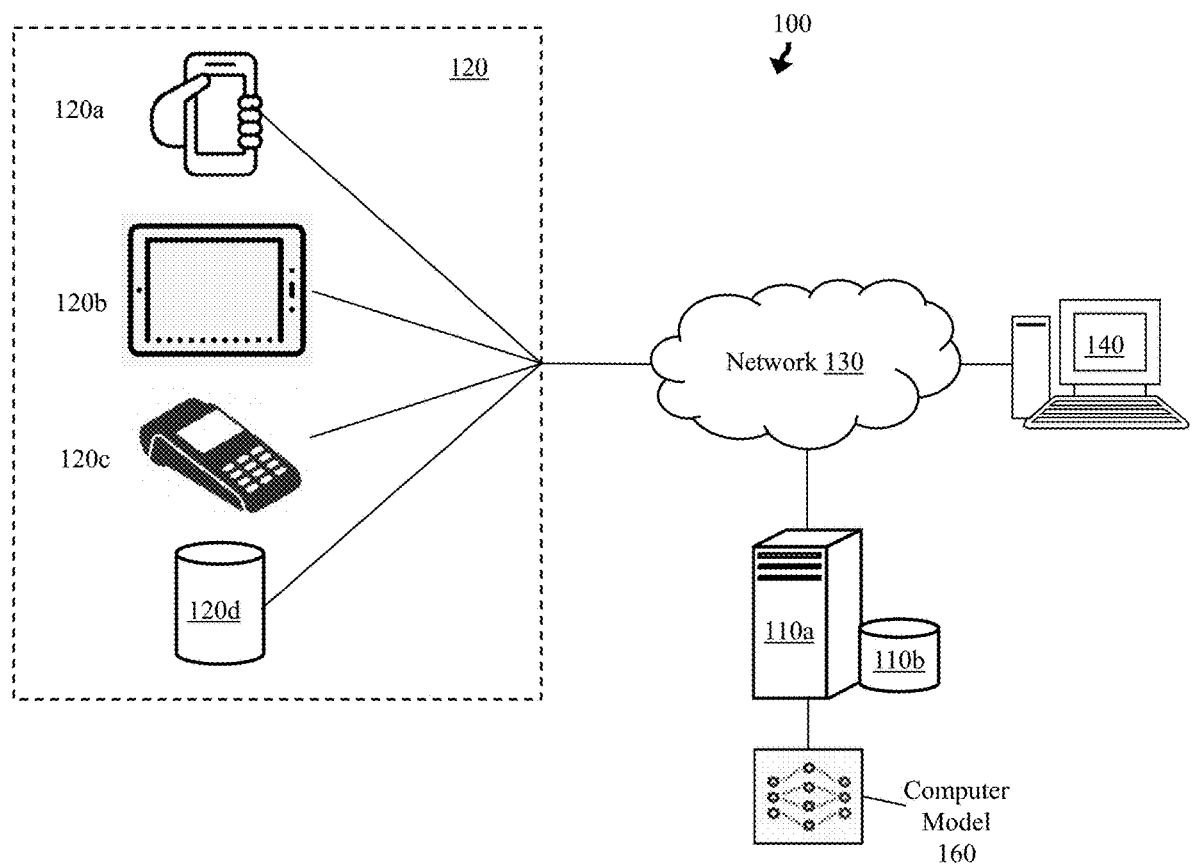
FIG. 1 illustrates various components of a gradual detection monitoring system, according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein—and additional applications of the principles of the subject matter illustrated herein—that would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

As will be described below, a server (referred to herein as the analytics server) can identify data slices and train/execute computer models to efficiently analyze data associated with an electronic payment system.

FIG. 1 is a non-limiting example of components of a gradual detection monitoring system 100 in which an analytics server 110a operates. The analytics server 110a may utilize features described in FIG. 1 to retrieve and analyze data and generate/display results. However, the system 100 is not confined to the components described herein and may include additional or other components not shown for brevity, which are to be considered within the scope of the embodiments described herein.

The analytics server 110a may be communicatively coupled to a system database 110b, an electronic payment system 120 (including electronic devices 120a-120e), and an administrator computing device 140. The analytics server 110a may also use various computer models (e.g., computer model 160) to analyze the data retrieved from the electronic payment system 120.

The above-mentioned components may be connected through a network 130. The examples of the network 130 may include, but are not limited to, private or public LAN, WLAN, MAN, WAN, and the Internet. The network 130 may include both wired and wireless communications according to one or more standards and/or via one or more transport mediums.

The communication over the network 130 may be performed in accordance with various communication protocols such as Transmission Control Protocol and Internet Protocol (TCP/IP), User Datagram Protocol (UDP), and IEEE communication protocols. In one example, the network 130 may include wireless communications according to Bluetooth specification sets or another standard or proprietary wireless communication protocol. In another example, the network 130 may also include communications over a cellular network, including, e.g., a GSM (Global System for Mobile Communications), CDMA (Code Division Multiple Access), and/or EDGE (Enhanced Data for Global Evolution) network.

The analytics server 110a may generate and display an electronic platform configured to output the results of analyzing data retrieved. The electronic platform may include one or more graphical user interfaces (GUIs) displayed on the administrator computing device 140. An example of the platform generated and hosted by the analytics server 110a may be a web-based application or a website configured to be displayed on various electronic devices, such as mobile devices, tablets, personal computers, and the like. In a non-limiting example, the platform may be used to identify possible fraudulent activity and/or system failures associated with the electronic payment system 120. For instance, the platform may indicate that one or more elements of transaction processing might be having technical issues. The platform may also indicate one or more attributes associated with the technical issue, e.g., the transaction server in Mexico is down.

The analytics server 110a may be any computing device comprising a processor and non-transitory, machine-readable storage capable of executing the various tasks and processes described herein. The analytics server 110a may employ various processors, such as a central processing unit (CPU) and graphics processing unit (GPU), among others. Non-limiting examples of such computing devices may include workstation computers, laptop computers, server computers, and the like. While the system 100 includes a single analytics server 110a, the analytics server 110a may include any number of computing devices operating in a distributed computing environment, such as a cloud environment.

The electronic payment system 120 may represent various electronic components that receive, retrieve, and/or access data needed to perform one or more transactions and facilitate payments. Therefore, the electronic payment system 120 may include various hardware and software components. For instance, the electronic payment system 120 may include an end-user device 120a executing a payment application (hosted by a payment server 120d). An end-user (e.g., merchant) may use the payment application to send/receive payments to other users or other recipients inside/outside a payment network. In another example, a merchant device 120b may execute the payment application (hosted by the payment server 120d) to facilitate transactions and generate transaction documents and receipts. In another example, a merchant may use a point-of-sale system 102c to facilitate one or more transactions (e.g., card-present transactions). In a non-limiting example, the electronic payment system 120 may represent a payment application hosted by one or more servers (e.g., payment server 120d) that facilitates electronic payments between different devices.

In some embodiments, the data received from different components of the electronic payment system 120 may be aggregated (e.g., by the payment server 120d) and may be transmitted to the analytics server 110a to be analyzed. The analytics server 110a may then apply various analytical protocols discussed herein to analyze the data and present the results for a system administrator operating the administrator computing device 140.

The administrator computing device 140 may represent a computing device operated by a system administrator. The administrator computing device 140 may be configured to display attributes generated by the analytics server 110a (e.g., various analytic metrics determined as a result of analyzing the data received from the electronic payment system 120 or data generated during training/execution of the computer model 160); monitor the computer model 160 utilized by the analytics server 110a, review feedback; and/or facilitate training or retraining (calibration) of the computer model 160 that are maintained by the analytics server 110a.

In a non-limiting example, an administrator may access the platform hosted by the analytics server 110a to access alerts generated by the analytics server 110a. The alerts may identify one or more anomalous behaviors associated with the electronic payment system 120. The administrator may review the alerts and indicate whether they are true positive alerts or false positive alerts. The analytics server 110a may monitor the administrator's activity and interactions with the alerts. If the analytics server 110a determines that the administrator has indicated a false positive, the analytics server 110a may re-calibrate the computer model 160 accordingly. Thereby, the analytics server 110a may generate a feedback loop where the data is periodically used to improve the system and retrain the computer model 160.

The computer model 160 may be trained using data received or retrieved from the analytics server 110a and/or the electronic payment system 120. The analytics server 110a may execute the computer model 160 to analyze the data and/or identify attributes needed to verify the data (e.g., thresholds needed to analyze the data). Additionally, the analytics server 110a may train the computer model 160 using a training dataset generated based on monitoring data associated with the electronic payment system 120. As depicted, the analytics server 110a may store the computer model 160 (e.g., neural networks, random forest, support vector machines, regression models, recurrent models, etc.) in an accessible data repository, such as the system database 110b.

An electronic payment system may utilize various methods to monitor its traffic, including data generated from conducting and facilitating transactions. Detecting an anomaly may indicate an underlying technical problem that needs to be rectified. Any component of the traffic paths can malfunction, potentially impacting the end-user's ability to conduct transactions and/or collect payments. Such issues may occasionally go unnoticed when they occur gradually.

In some embodiments, technical issues and anomalies may arise due to code modifications introduced by the users/merchants, the electronic payment system, or even the payment processing entities (e.g., banks). These changes typically undergo a ramp-up process. For instance, only 5% of the volume might be placed on the new code initially, while the remainder of the old code is gradually updated accordingly. Therefore, if the code is faulty, its results may not be detected as readily easily. Moreover, conventional monitoring systems (filtering or thresholding) may not be efficient or accurate because, when the new code is faulty, the overall metrics may not drastically change, and the anomalies may be diluted due to their small role/proportion within the comprehensive system.

Conventional methods to detect such issues have proven to be inefficient. Therefore, what is needed is a computer modeling technique that uses gradual degradation algorithms. Using the methods and systems discussed herein, e.g., method 200, a server may monitor large/aggregated data and identify anomalous behavior accordingly. Using the computer model discussed herein, the analytics server may be able to identify gradual changes using dynamically generated data slices. The server may then display alerts indicating the root cause of the problem. Additionally, using the computer model discussed herein (and a method 200), intelligent notifications and labeling methods can be implemented to identify more critical anomalies. This allows system administrators to triage among multiple detected anomalies.

Figure 2A:
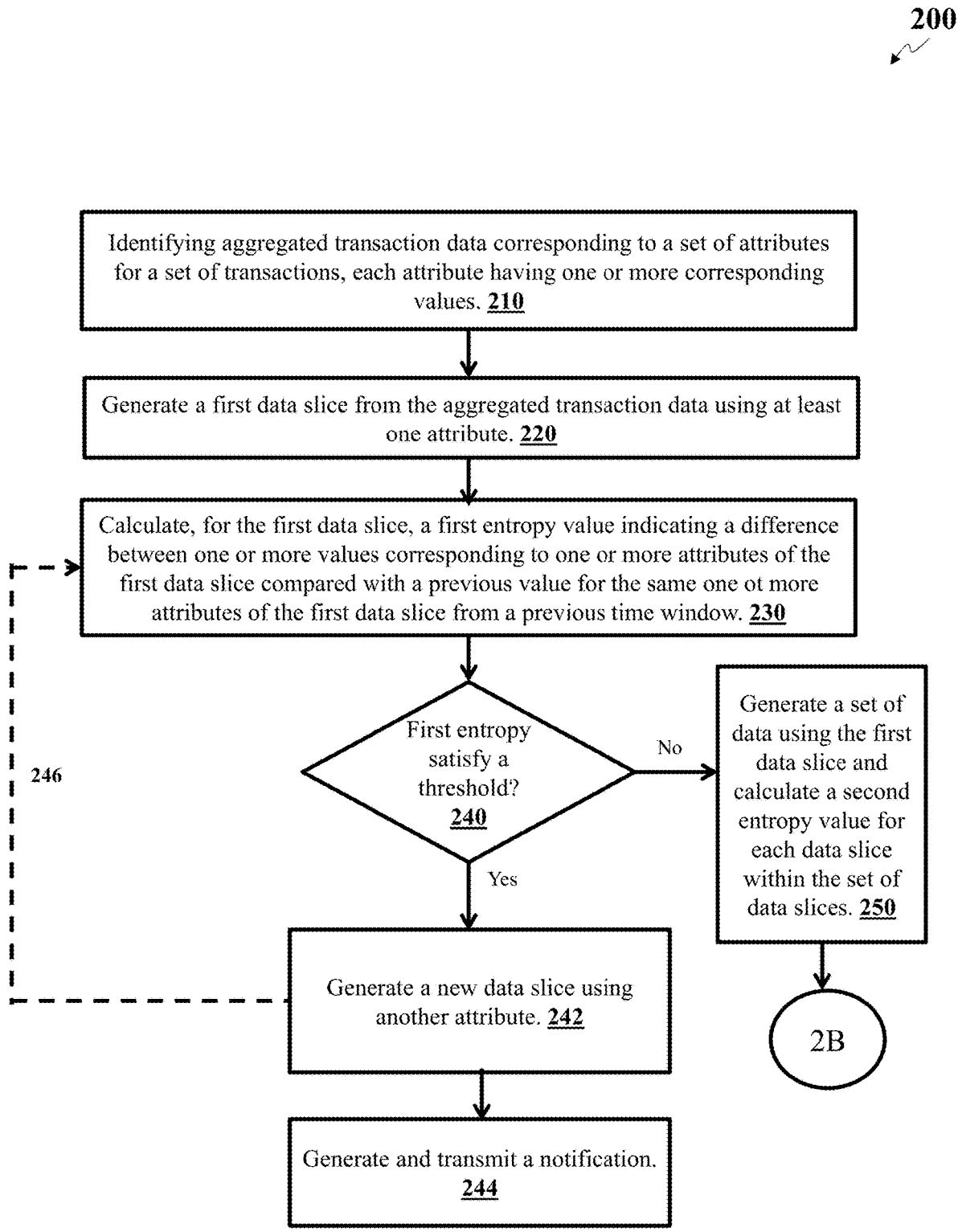
FIGS. 2A-B illustrate a flow diagram of a process executed in a gradual detection monitoring system, according to an embodiment.
Figure 2B:
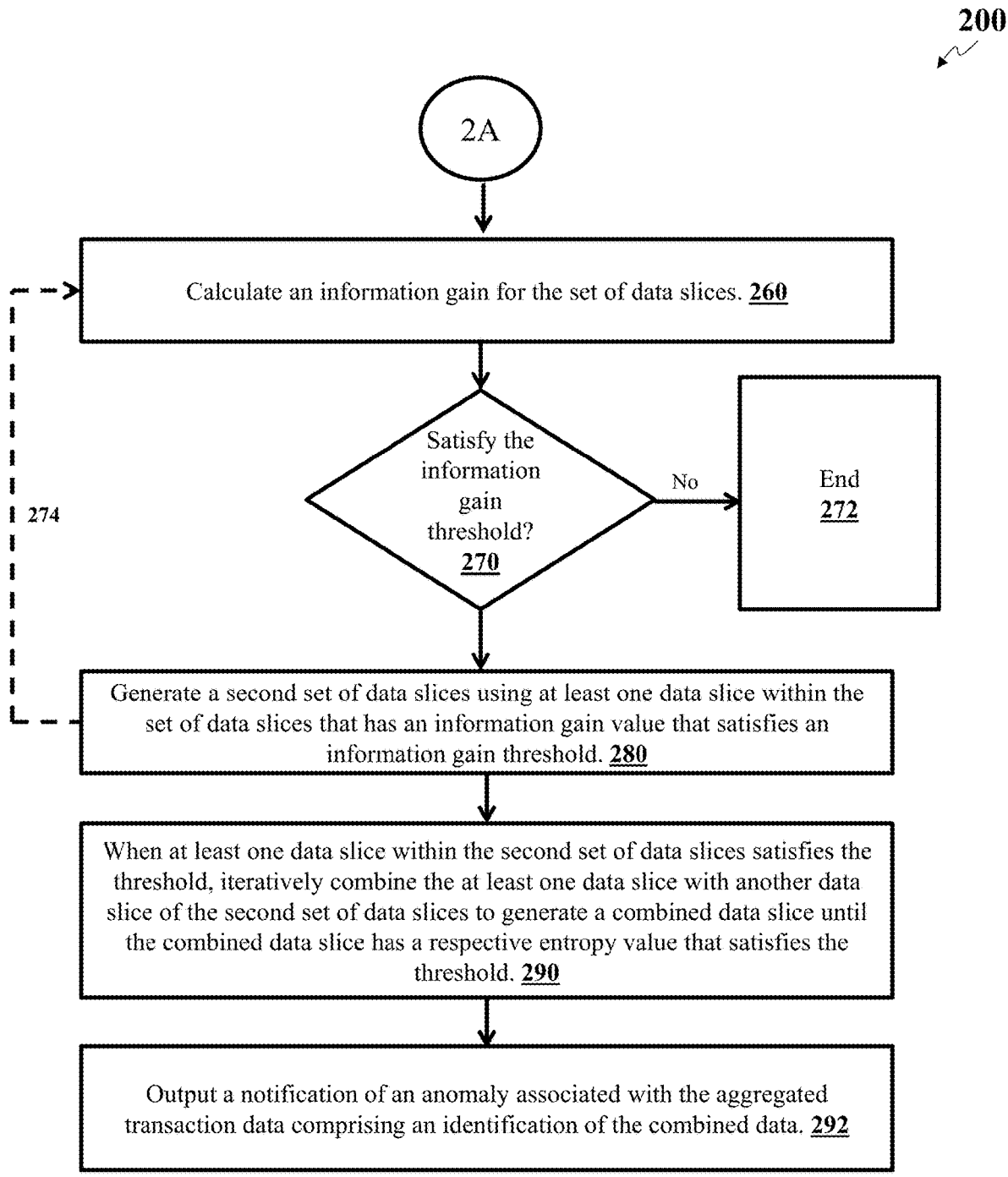

Referring to FIGS. 2A-B, the method 200 illustrates a flow diagram of a process executed in a gradual drop detection monitoring system, according to an embodiment. The method 200 includes steps 210-292. However, other embodiments may include additional or alternative execution steps or omit one or more steps altogether. The method 200 is described as being executed by a server, similar to the analytics server described in FIG. 1. However, one or more steps of the method 200 may also be executed by any number of computing devices operating in the distributed computing system described in FIG. 1.

Using the methods and systems described herein, such as the method 200, the analytics server may intelligently segregate data, generate dynamic data slices, and analyze the data slices such that the results can indicate an anomaly in an electronic payment system. The computer model discussed herein can dynamically generate unique data slices and identify anomalies, even if the anomaly results from a gradual change in a metric, such as the authorization rate.

Various degradation detection methods can identify data slices corresponding to root causes for anomalies caused by sudden changes (e.g., drops or declines) in various metrics, such as the authorization rate. In some embodiments, however, using the method 200, the analytics server may also identify anomalies even though the anomalies are caused by a gradual change (e.g., drop or decline) in one or more metrics. Therefore, the method 200 allows for a robust monitoring of data.

At step 210, the analytics server may identify aggregated transaction data corresponding to a set of attributes for a set of transactions, each attribute having one or more corresponding values.

The data identified/retrieved may be an aggregated collection of data associated with the electronic payment system. Therefore, the aggregated data may correspond to transactions conducted using the electronic payment system discussed herein. Accordingly, the data identified/retrieved may include all the data generated by an electronic payment system. Therefore, the data may consist of a set of attributes associated with the set of transactions where each attribute also includes (or corresponds to) a value. An attribute, as used herein, may refer to any characteristic of the transaction collected by one or more components of the electronic payment system.

The attribute (within each data slice) may have a corresponding value where different values may belong to different categories, such as numeric, binary, and the like. For instance, an attribute of "card-present" may include a binary value of 0 or 1, indicating whether a card was present during a transaction. In contrast, an attribute of "time" may include four digits indicating a timestamp of the transaction (e.g., 10:39 or 1039). In another example, an attribute of "fiat" may have a corresponding value of "yen," "US Dollar," or "Pesos." In another example, an attribute may be an "issuing bank," and the value may be the issuing bank's name. In another example, the attribute may correspond to an attribute of electronic communication associated with the transaction. For instance, a binary attribute may correspond to whether a transaction server (e.g., a server of the electronic payment system) transmitted a CVC number (or other information needed to process the payment) to a payment processing server. In yet another example, the attribute may correspond to the transaction's country/location, and the value may indicate the location of the transaction (e.g., US, CA, or CH).

In some embodiments, the analytics server may monitor collective data records linked to an electronic payment system, which may include information corresponding to various characteristics/attributes of the transactions conducted/facilitated by the electronic payment system. In some cases, the analytics server may utilize one or more Application Programming Interfaces (APIs) to gather data from various sources related to the electronic payment system. For example, the analytics server may connect with point-of-sale (POS) systems and/or servers operated by third parties that support transactions in the electronic payment system, such as those belonging to clearinghouses, banks, third-party vendors, and similar entities.

Additionally, the analytics server may communicate with servers executing a payment application that facilitates transactions among users (e.g., between merchants and customers or in peer-to-peer payments). The received data may be an assembled collection from the electronic payment system, representing a range of transactions carried out using the system or otherwise associated with the system (e.g., a transaction from an account generated by the system). This data encompasses various attributes linked to these transactions, where each attribute is paired with a corresponding value.

At step 220, the analytics server may execute (sometimes periodically) a computer model that performs the steps 220-290. As discussed herein, the computer model can perform various steps iteratively. At the step 220, the computer model may generate a first data slice from the aggregated transaction data using at least one attribute.

The computer model may perform iterative data slicing and analysis in a particular way (described herein). The computer model may generate a hierarchy of data slices and traverse the hierarchy while analyzing the data. The computer model may also utilize various algorithms to optimize generating data slices and traversing the hierarchy of data slices. For instance, the computer model may train machine learning components or use a boosted tree algorithm to optimize how data is segregated and then combined such that the largest data slice indicating anomalous behavior is identified.

The analytics server may segregate the identified/retrieved data (e.g., step 210) into a first data slice. The first data slice may be generated using at least one attribute. For instance, the aggregated transaction data may be filtered into two or more groups in accordance with the at least one attribute. The attribute used to generate the first data slice may be selected randomly, be user-defined, and/or be a default attribute identified by a system administrator. In some embodiments, the initial attribute used to generate the first data slice may be predicted/identified by the computer model. The attributes used to slice the data may correspond to an attribute that has a historical trend indicating anomalous behavior. In another example, with each iteration and analysis, the computer model may learn how to slice the data such that it provides the best results.

The first data slice may represent an initial data slice from which the other data slices are created. Accordingly, in the hierarchy of data slices, the first data slice may represent the first level. Using the methods discussed herein, the computer model may drill down and disaggregate the data systematically. Therefore, in some embodiments, even if the first data slice is generated using an attribute that does not yield results, the computer model may (in a new iteration) generate another data slice using another attribute. The computer model may generate the initial data slice as many times as needed in order to (eventually) identify the correct path within the data slice hierarchy. The analytics server may train the computer model (or sometimes a separate computer model) to optimize the traversal of different paths and predict the best attributes to use when segmenting the data and generating the data slices discussed herein.

The raw/aggregated data (collected in the step 210) may belong to various dimensions and include various attributes. Using the methods and systems discussed herein, the aggregated data may be segmented into multiple data slices that are dynamically analyzed. In some embodiments, different combinations of variables may be created. Therefore, certain data slices may include overlapping data. For instance, given three variables/dimensions of the country (US and Canada), card present (yes or no), and merchant (ride-sharing application or not), the analytics server may generate different data slices where the data corresponds to different permutations of the three variables:

|  | Country | Card Present? | Ride Sharing App? |
| --- | --- | --- | --- |
| Permutation 1 | US | Y | Y |
| Permutation 2 | US | Y | N |
| Permutation 3 | US | N | Y |
| Permutation 4 | US | N | N |
| Permutation 5 | CA | Y | Y |
| Permutation 6 | CA | Y | N |
| Permutation 7 | CA | N | Y |
| Permutation 8 | CA | N | N |

Each permutation illustrated above may represent a set of transactions and their corresponding data. Therefore, each permutation may be considered a data slice.

In some embodiments, the computer model may use the country of the transaction to generate the first data slice. Therefore, the first data slice may include all transactions conducted in the United States or Canada. As discussed herein, the first data slice can be further (and iteratively) sliced/segmented into smaller data slices. For instance, the same data slice can be segmented further into all United States transactions conducted in person (e.g., card present transactions). Moreover, the subsequent data slice can be segmented further using other attributes, such as merchant type, card issuer type, and the like.

At step 230, the analytics server may calculate, for the first data slice, a first entropy value indicating a difference between one or more values corresponding to one or more attributes of the first data slice compared with a previous value for the same one or more attributes of the first data slice from a previous time window.

The computer model may analyze the transactions within the first data slice and calculate an entropy value for the first data slice. The computer model may determine whether the first data slice indicates anomalous behavior using its respective entropy value. In order to calculate the entropy value, the computer model may use a rolling time window for the data slice (e.g., for the first data slice at this step and for other data slices in other steps). It may compare the rolling time window with a previous corresponding time window. A rolling time window, as used herein, may refer to analyzing a subset of data points sequential in time and then "rolling" (or moving) that window through the data points over a defined time period. Effectively, the analytics server may segment a large dataset into smaller, overlapping data segments such that the analytics server can perform detailed and local analysis to identify a metric associated with each data slice. Therefore, the rolling time window may be considered a baseline to compare various metrics with similar metrics calculated using other (previous or historical) rolling time windows.

In a non-limiting example, given a rolling time window of a week, the computer model may analyze the authorization rate associated with transactions included within each of the eight data slices illustrated above for the last seven days. The computer model may then compare the authorization rate of the previous week with the authorization rate of a prior corresponding rolling time window for the same data slice, such as the authorization rate of the same (or related) week last month or last year. In a non-limiting example, the authorization rate of the first week of a month may be compared to the first week of a previous month or the same month last year.

The bounds and limits of the rolling time window may be automatically selected by the analytics server and/or inputted by a user. For instance, an end user may want to compare the authorization rate to a previous month, year, or any desired rolling time window. The rolling time window can be customized using a portal to tailor the results for the end user. Using the rolling windows, the computer model may compare any metric and determine whether the metric has changed and, if so, whether the change is more than a defined threshold that would indicate anomalous behavior. These changes are also referred to herein as "dips" or "drops." As discussed herein, changes in any metric may be used to determine the existence of an anomaly.

An example of a metric may be an authorization rate. In some embodiments, in an electronic payment system, the decision to authorize or decline a transaction is determined by various processes based on user payment activities. This success rate is often called the "authorization rate" or "auth rate." It is expressly understood that the methods and systems discussed herein apply to all metrics. Therefore, the method 200 is not limited to authorization rates.

At step 240, the computer model may determine whether the first entropy (calculated using the first data slice) satisfies a threshold. The analytics server may use a threshold to determine whether the changes (if any) detected when comparing the metrics within the rolling time windows indicate an anomaly. Therefore, the threshold may be used to determine whether the changes are due to non-anomalous or anomalous behavior. Almost all metrics associated with transaction data may vary due to appropriate conditions. For instance, the authorization rate of a data slice may change due to increased sales or other factors. However, this rate change may not necessarily indicate anomalous behavior. Using the threshold, the computer model can focus on changes that indicate anomalous behavior, such as code issues, POS problems, and the like.

In some embodiments, the computer model may use a pre-determined threshold. For instance, if the authorization rate of a data slice has changed by more than 30%, the computer model may assume that an anomaly exists. In some other embodiments, the threshold may be dynamic (e.g., changing based on various other factors) or may be identified using a different computer model.

In some embodiments, the threshold may vary based on the specific characteristics of the data slice. For example, a smaller data slice representing a narrower portion of transactions might need a lower threshold compared to a larger data slice representing a greater number of transactions. Therefore, the threshold may depend on the size of the data slice. Moreover, the threshold may also depend on the attribute with which the first data slice was generated. For instance, the threshold for transactions in New York City may be different than the threshold used in Dallas. In another example, a card issuer may have gone bankrupt and stopped their services. Therefore, the data slice containing a large portion of transactions associated with that card issuer may include a very high number of declines. However, the high number of declines, in this example, is not due to anomalous behavior of the payment system.

Accordingly, the computer model may be configured to identify data slices with anomalies in at least two ways. First, the computer model may identify a data slice or a combination of data slices that indicate an anomaly while the data traffic remains roughly the same. Second, the computer model may identify a data slice and/or a combination of data slices where the data slice's performance trends toward an anomaly.

If the computer model determines that the first slice satisfies the threshold (e.g., the first data slice exhibits anomalous behavior), the analytics server may move to the step 242 (the "yes" branch). At step 242, the computer model may optionally generate a new data slice using another attribute, such as a new attribute not used to generate the first data slice. The computer model may then move to the step 230 to generate a new entropy value for the new data slice and repeat the process as many times as needed until the data slice does not satisfy the threshold (loop 246). The analytics server may then generate and transmit a notification to a system administrator indicating that the first slice exhibits anomalous behavior.

If the first data slice indicates anomalous behavior, the computer model may no longer be needed to further segment the data. Instead, the computer model informs the system administrator of the problem. This case may not be typical because only significant anomalous behavior (e.g., major drops in authorization rate) can cause the initial data slice to exhibit anomalous behavior. In a non-limiting example of this concept, if the analytics server determines that the authorization rate in all US transactions is dropping at a significant rate, then the analytics server may notify the system administrator.

If the computer model determines that the threshold is not satisfied (e.g., the first data slice does not exhibit anomalous behavior), then the computer model may move to the step 250 (the "no" branch).

At step 250, the computer model may disaggregate the first data slice into smaller data slices. Therefore, the computer model may generate a set of data slices using the data within the first data slice. Using the methods discussed herein, the computer model may also generate an entropy value for each data slice.

At step 260 (depicted in FIG. 2B), the computer model may also identify an information gain value for each data slice within the set of data slices. As used herein, information gain may correspond to a measure or metric used to determine how much a data slice can contribute to improving the computer model's prediction/identification of the anomaly. The information gain value, in the context of the hierarchy of data slices, may refer to a measure or metric used to determine which data slice should be used to generate further data slices (e.g., smaller data slices) at each step in the hierarchy of data slices. In some embodiments, the information gain value may be based on the concept of entropy discussed herein (the measure of the randomness or impurity in the data set that exhibits anomalous behavior). In some embodiments, the information gain value may be used to select the data slice that would result in the highest (or optimized) reduction of the entropy. The information gain value may indicate that slicing a particular data slice further into smaller data slices may provide more information regarding the anomaly. Therefore, if the information gain value is higher than a threshold, then the data slice should be further sliced into smaller data slices.

The computer model may use a variety of methods to calculate the information gain value for the data slices. For instance, the entropy of the data slices can be compared before and after being segmented, such that the computer model may determine whether the entropy increased or decreased.

At step 270, the computer model may determine whether the information gain value calculated for the data slices satisfies a threshold. The computer model may use this threshold to identify data slices with the highest information gain value. In some embodiments, the computer model may select the data slice with the highest information (or sometimes the top three data slices having the top three information gains) to generate a new set of smaller data slices.

If the information gain value for a data slice is below the threshold (the "no" branch), the data slice may not be segmented into further data slices, and the process may stop (step 272). However, if one or more data slices satisfy the information gain threshold, the data slices can be segmented further into a second set of data slices (step 280).

The computer model may iteratively repeat this process unless and until the data is segregated into slices that no longer satisfy the information gain threshold. That is, the data will be segmented using different attributes unless the information gain value indicates that segmenting the data further will not identify a different entropy (e.g., indicate that the data should be further segmented/sliced). This concept is depicted using the loop 274. In some embodiments, the loop 274 may proceed with the step 250 instead.

At step 290, when at least one data slice within the second set of data slices satisfies the threshold, the computer model may iteratively combine the at least one data slice with another data slice of the second set of data slices to generate a combined data slice until the combined data slice has a respective entropy value that satisfies the threshold.

The entropy threshold used to determine whether a data slice indicates anomalous behavior can be used to stop iterations of slicing the data. For instance, in some embodiments, if the entropy indicates that the data slice indicates anomalous behavior and if the information gain value indicates that further slicing the data is no longer appropriate or beneficial, the computer model determines that it has identified the smallest data slice indicating an anomaly. That is, using the loop 274, the computer model may continue generating the data until the smallest data slice indicating anomalous behavior is identified. When this criterion is met, the computer model may no longer generate new data slices.

The computer model may iteratively traverse the hierarchy of data slices in the reverse direction (e.g., reverse up the tree) and combine the data slices together. As discussed herein, with respect to the step 210-290, the computer model may "drill down" and identify a root cause or the purest/smallest data slice that would indicate an anomaly. However, in some embodiments, the smallest data slice may not necessarily indicate the data needed to rectify the anomaly. For instance, the smallest data slice may indicate where the problem has occurred but may include too few transactions.

Therefore, identification of the smallest data slice exhibiting an anomaly may not be practical. Accordingly, the computer model may combine the data slices and re-calculate the entropy values. If the entropy value does satisfy the threshold, the computer model may combine more data slices until the largest data slice indicating anomalous behavior is identified.

Figure 4:
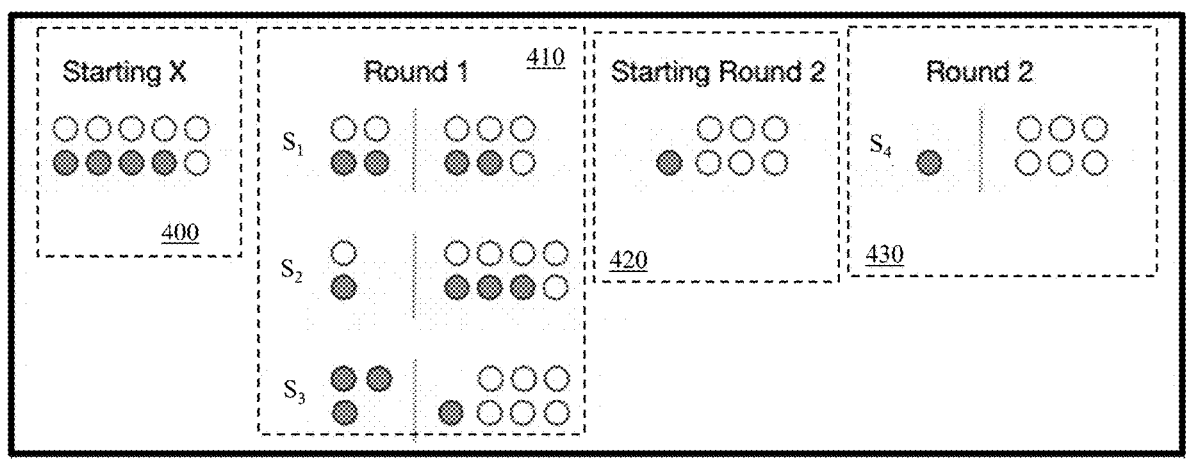

FIGS. 3-4 illustrate a non-limiting example of the operation of the computer model. In the non-limiting example depicted in FIGS. 3-4, the computer model applies customized data slicing to explain user authorization rate changes between a target and a comparison period via any single-value multi-dimensional categorical variables. The computer model may use a boosted tree algorithm that finds the purest or smallest partition (or data slice) that separates the degraded traffic from the healthy traffic. This data slice is sometimes referred to as the root cause. The computer model may then sequentially do the same for the residual data. The computer model may achieve this using information gain value, and the resulting decomposition may be mutually exclusive and collectively exhaustive (MECE).

In a non-limiting example, the computer model may be tasked with comparing data slices to identify changes in authorization rate between two periods (time windows), $A_c$ and $A_p$. The computer model may decompose the aggregated data into a mutually exclusive, collectively exhaustive set of data slices where c connotes "current" and p connotes "prior." Along with the authorization rates, the computer model may also have volume (e.g., number of transactions) for the two periods, Ne and Np, and a set of k categorical dimensions $D_i$ with $m_i$ unique values for i=1 . . . k. For illustration purposes, the present disclosure only illustrates k=2-dimensions where:

$D_1$ is region with $m_1$=4 unique values {NA, EMEA, APAC, LATAM}

$D_2$ is segment with $m_2$=2 unique values {Startup, SMB}

The computer model may consider a set of data slices where the computer model selects 0 or 1 value from each $D_i$. In the above example, there may be $$\prod_1^k (m_i + 1) - 1 = (5 \times 3) - 1 = 14$$

data slices/segmentations.

The computer model may also consider the "complement" of a data slice. The complement, as used herein, may refer to the remains after the contribution of a slice is removed.

The set of all partitions can be denoted as S and a single partition as s and its complement as $s^c$.

The computer model may iteratively analyze different data slices and iteratively decompose the data until a data slice and/or a combination of data slices captures most of the data degradation, indicating one or more anomalies while the complement authorization rate improves or plateaus. The computer model may analyze data slices as granular as needed to find the specific slice of degraded data. However, the computer model may not slice the data further to achieve parsimony.

The computer model may define an encoding to map the authorization rate into an information theory. The computer model may also use/maximize entropy to achieve efficiency and increase result accuracy. Entropy may be defined as follows:

Entropy=$H(X)$=$-\Sigma x \in X\ p(x) \cdot \log(p(x))$

Where given a dataset X, the computer model may select s such that information gain is increased or maximized:

argmax$\{s\}H(X)-[w_s H(s)+(1-w_s)H(s^c)]$ where $w_s=N_s/N_x$ is the share of transaction of slice s over total transactions and H(s) and H($s^c$) are Entropy for slice s and c respectively.

Since H(X) may be a constant across s, the computer model may maximize the $2^{nd}$ term, the weighted entropy of the data slice, and its complement. Assuming an illustrative problem with two classes, where the computer model encodes what has changed and what has remained unchanged between two time periods, the computer model may use the techniques discussed herein to partition the data such that most of the changed volume is contained in a data slice and most of the unchanged volume is contained in its complement.

The computer model may use various ways to encode the information, each revealing different aspects of the change within the data. These all map from the original authorization rate between two time periods into an information problem with two classes.

The chart 300 illustrates how different data slices can be analyzed. As depicted within a column 330, the filled circles indicate a change within the data compared to the corresponding data from different rolling time windows.

The unchanged transactions (unfilled circles) may be represented by:

$N_c$—changed.

As depicted within a row 340 and a column 310, the current authorization rate ($A_c$) and prior authorization rate ($A_p$) may be 70% and 90%, respectively, while the current volume or the number of transactions within that particular data slice ($N_c$) may be 10 transactions. This maps to the information problem of two filled circles (column 330), indicating two degraded transactions while the remaining transactions are unchanged. This also indicates that the data slice evaluated (as represented in a row 340) has an entropy value of 20%.

In some embodiments, an anomaly or degradation may be defined in terms of failed transactions, decline of authorized transactions, and/or other degradation data. However, in some embodiments, an improvement of an attribute or metric may also indicate an anomaly within the system. For instance, an increase in the refund rate may technically be an improvement. However, this change may indicate an anomaly. Therefore, the computer model may also flag improvements in certain attributes as a possible anomaly. In some embodiments, as depicted in the chart 300, the computer model may use different mappings and formulas to determine anomalies for different data slices.

As depicted within the row 350, the computer model may determine that the refund rate (or any other metric) has improved by 40% when data for corresponding rolling time windows are compared. Similarly, the row 360 illustrates how to calculate the difference using an absolute value, which does not depend on whether the entropy corresponds to an improvement or degradation/drop.

The chart 300 illustrates three separate methods of analyzing data slices. Using one or more methods depicted within the chart 300, the computer model may analyze the remaining data slices. The computer model may then optimize an objective function using Information Gain. For instance, the computer model may iteratively divide the data slice (indicating an anomaly) into smaller data slicers and repeat the calculations discussed herein until the computer model identifies a root cause.

The data slices may be represented by a hierarchical data structure where different data slices (smaller slices) are a subset of another data slice (bigger slices). For instance, a first data slice may include 100 transactions relating to five attributes, which then can be further segmented into five smaller data slices having fewer attributes (and potentially fewer number of transactions) and further segmented into smaller slices having fewer attributes (and potentially fewer number of transactions). Therefore, the computer model may drill down to identify a root cause in some embodiments. However, in some embodiments, a root cause may not be desirable to present to the end-user. For instance, the root cause may include only a single variable and a few transactions, which may be too small to identify a problem to be rectified. As a result, the computer model may traverse the hierarchical data structure to identify the largest data slice that indicates an anomaly.

With each iteration, the computer model may combine the data slice with one or more data slices (resulting in a larger data slice) and re-analyze the data. If the combined data slice indicates an anomaly that satisfies a threshold (e.g., more than a defined percentage of change), the computer model may combine the data slice with another and analyze the resultant data slice. The computer model may continue to iteratively analyze the data until the anomaly is diluted within the resultant data slice (e.g., the resultant data slice does not indicate an anomaly).

In a non-limiting example, the smallest data slice indicating a root cause of an anomaly may be a set of transactions in Latin America for "card not present" transactions for a particular ride-sharing application for a card issuer X. However, that data slice may be too small. As a result, the analytics server iteratively adds different data slices. The computer model may continue the iteration until the largest data slice indicating the anomaly is identified (e.g., data slice for all Latin American transactions associated with the card issuer X). Information gain value can be used to optimize how the analytics server/computer model traverses the hierarchical data structure of the data slices.

The computer model discussed herein can analyze the aggregated data without having fixed data slices. Accordingly, the computer uses dynamic slicing where the data may overlap. The computer model may iteratively traverse the hierarchical data structure and analyze different data slices to identify the appropriate data slices. Therefore, the identified data slice may be unique. The computer model may perform these iterations without having fixed/static and/or predefined variables to slice the data. Having this paradigm allows the computer model to efficiently analyze the data. For instance, because anomalous behavior cannot be predicted, the computer model's flexible approach allows it to analyze various variables/data slices in a scalable manner. Also, using this paradigm may result in more data slices to be analyzed. The algorithm used by the computer model is illustrated in FIG. 4.

In a non-limiting example depicted in FIG. 4, the computer model may receive one or more dimensions or variables to slice the data and may iteratively slice the data until an anomaly is detected. The computer model may then analyze the remaining data slices accordingly. For instance, given a list of dimensions, two rolling time windows, and a definition of the granularity of the data to be analyzed (e.g., a particular ride-sharing application or a particular merchant), the computer model may set dataset x as the universe. The computer model may then iteratively produce all slices ($s \in S$), encode the information the end user is interested in using the transformations discussed herein, calculate information gain for each possible data slice, select the data slice that gives maximum information gain, adds to explanations, and removes the identified data slice from the dataset, e.g., set $X = s^c$.

The computer model may iteratively repeat the process discussed above until a result is identified. In some embodiments, the stopping criteria may be driven by either a pre-configured number of insights (e.g., 3) or when the dataset becomes too small to slice by. FIG. 4 illustrates how the computer model may iteratively analyze datasets. FIG. 4 only illustrates two iterations (rounds). However, other embodiments may include more iterations. For instance, the starting point 400 (universe x) may include various filled and unfilled circles. As discussed herein, the filled circle may represent degradation or improvement (or generally a change within the data when compared to a corresponding time window). As a result, the computer model may generate smaller data slices, as depicted within round 1 (410). The computer model may generate all slices ($s \in S$) calculate information gain for each possible data slice, select the data slice that gives maximum information gain, and move to the next iterations (420 and 430).

Using the method 200, the analytics server may identify pockets (e.g., data slices dynamically selected) of degraded transactions. The method 200 can be executed periodically, such as weekly, so a dashboard can be populated to visualize degradation and anomalies. Moreover, even though the computer model has been described to compare two separate time windows, other embodiments may include more time windows. For instance, an end-user may define the time windows such that the results are as granular as desired.

The analytics server and/or the computer model may also produce mix and rate shifts in conjunction with other contextual information to help users build a better narrative around and identify insights regarding the data.

In some embodiments, more dimensions the computer model uses may result in better (more robust) output. Generally, there may exist a trade-off between detection power vs. computation time. However, more dimensions analyzed by the computer model may mean a higher chance of detecting where the anomaly has occurred. In some embodiments, the statistical noise may be negligible due to how the computer model constructs information gain value from the slice and its complement. In operation, the end user may define a number of dimensions (e.g., variables to be analyzed), and the computer model may iteratively slice the data using those variables. The computer model may also continue adding other data slices. Therefore, the slicing of the data may not be limited to the variables provided by the user.

Because the computer model uses a sequential algorithm working on the residual (what remains), some data slices or combinations of data slices may be hard for a human to comprehend. To avoid this confusion, the computer model may be modified to provide the overlap contribution.

The computer model may encode all the increase and decrease in authorization rate into a single encoding. Another embodiment may include tracking the decline codes where and when an authorization is declined. In some embodiments, the payment system may receive different codes, such as "do not honor," "insufficient funds," and the like. The computer model may track the codes to improve its analysis of data slices. This may require cross-entropy and reorganizing the information.

When the computer model generates the data slices, the computer model may allow {0,1} unique values from each dimension $D_i$, however, this idea can be extended to include $\{0,1, \ldots (m_i-1)\}$ unique values used to slice the data into different data slices.

The end user may input one or more dimensions to be analyzed by the analytics server. The inputted dimensions may correspond to "problematic" dimensions or categories where the end user suspects there could possibly be a problem. The computer model may then slice the data accordingly using the methodologies discussed herein.

Using the computer model discussed herein also allows for a scalable method of identifying the root cause for a problem and presenting the root cause. This eliminates the need to review charts indicating different dimensions.

The analytics server may present input elements (e.g., text box, radio button, drop-down menu), allowing end users to label the identified anomaly. In some embodiments, the end user's labeling of the anomaly may be used to correct or recalibrate the computer model. For instance, if a number of users (e.g., above a threshold) indicate a detected anomaly as a false positive, the analytics server may recalibrate the computer model accordingly. For instance, one or more variables the computer model uses may be revised based on whether a detected anomaly was labeled as a false positive.

The analytics server may use the label to identify the anomaly. For instance, a designated name can be received from a user. When outputting data associated with the detected anomaly (e.g., alerts or dashboard graphs), the analytics server may refer to the anomaly using the label received from the user.

After identifying an anomaly, the analytics server may execute one or more algorithms to determine a remedial action. The algorithm may encode a set of defined rules indicating how a remedial action should be identified. The remedial action may be suggested to the user. In some embodiments, the analytics server may query and identify an action that was performed during a time period associated with the anomaly (e.g., code update, use of a new parameter, or use of a payment processor).

Referring back to FIG. 2, at step 292, the analytics server may output a notification of an anomaly associated with the aggregated transaction data comprising an identification of the combined data slice and the one or more values from the first data slice and the second data slice.

The analytics server may output the identified data slice and the corresponding anomaly. In a non-limiting example, if the anomaly is detected, the analytics server may transmit an alert through one or more electronic messaging protocols, such as an email can be generated and sent to a system administrator or a message may be circulated internally through a messaging portal and an integrated chat software. When the pertinent teams, including technical account managers/engineers and system administrators, receive this alert, they may access a pre-defined dashboard that directly indicates the problem's source. They may then collaborate with engineers to diagnose the root cause, determining whether it's due to a user deploying a faulty code change, an issue from the payment system, or another reason.

Gradual drop alerts may operate periodically (e.g., weekly) and identify slow drops in authorization rates or any other metric desired by comparing a week of traffic to the same data slice last month (or any other time period indicated by the end-user).

The analytics server may monitor the computer model and collect the data slices generated using the method 200 and may train a machine learning component of the computer model and/or a second computer model using the collected data. For instance, the analytics server may generate a training dataset comprising the hierarchy of data slices, number of data slices, attributes used to generate the data slices, data associated with the computer model traversing the hierarchy of data slices, entropy values calculated, information gain values calculated, or any other data associated with the operation of the computer model. In some embodiments, only one of the data discussed herein can be included within the training data. For instance, in some embodiments, the training dataset may include only the information gain values. In other embodiments, more than one (or sometimes all) the data discussed herein within the training dataset.

The analytics server may then use the training data to train the machine learning component and/or the second computer model, such that when trained, the computer model can predict which attribute to generate the data slices, how to traverse the hierarchy of data slices, and the like. In this way, when the computer model is analyzing a new dataset (or analyzing the same aggregated data at a later time), the computer model can optimize its performance. For instance, the computer model may predict which attribute to use to generate the first data slice.

In a non-limiting example, the computer model may use a boosted tree algorithm to optimize its operations. The boosted tree can be optimized using the information gain values. Using the optimized boosted tree, the computer model may determine which data slice needs to be further sliced into smaller data slices. In another example, the computer model may determine the path with the highest likelihood of yielding results, such that the calculation can be performed using less computing resources or time.

Training the computer model can also allow the computer model to dynamically generate data slices without any inputs from the user and/or a system administrator. For instance, many conventional systems require the use inputs or at least an initial input regarding how to slice the data (which attribute to use to generate data slices) and when to slice the data. These conventional approaches provide static data-slicing methods. In contrast, using the methods and systems discussed herein, the computer model can dynamically generate data slices, create a hierarchy of data slices, and traverse the hierarchy until results are identified.

Figure 5A:
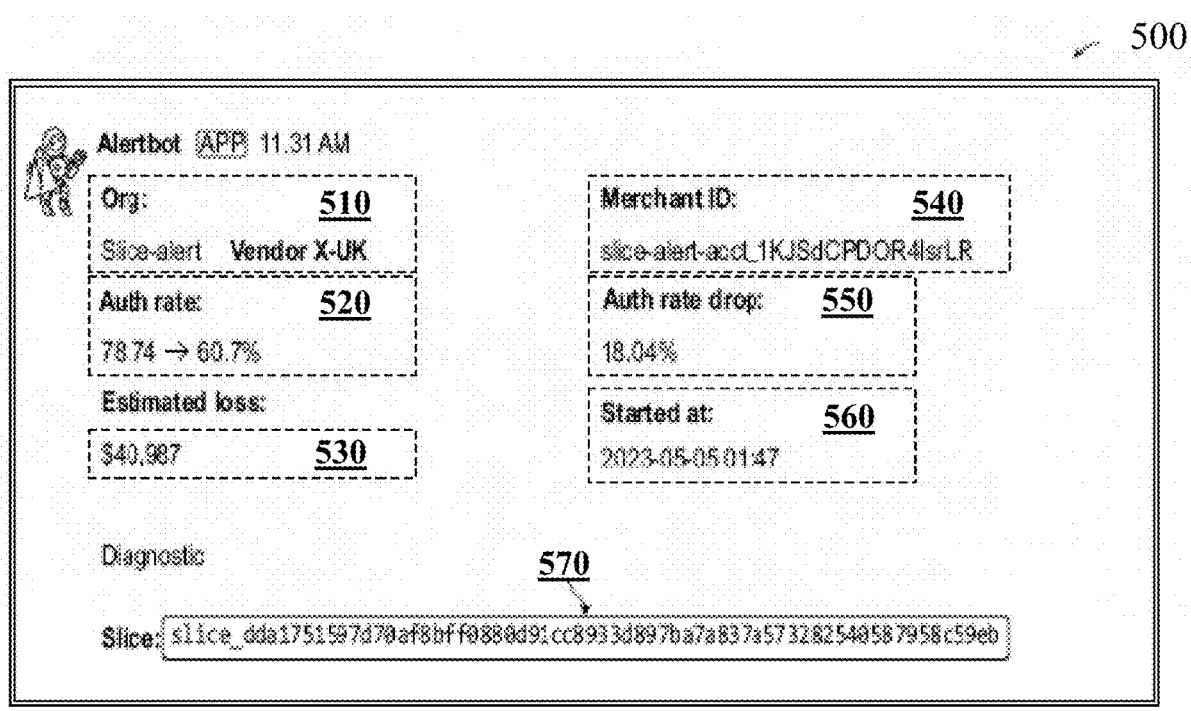

Referring now to FIG. 5A, a non-limiting example of an alert 500 is presented. In some embodiments, the alert 500 may be displayed on an electronic device associated with a system administrator and/or other employees. The alert 500 includes a section 510, indicating the name of the vendor associated with an anomalous data slice and a merchant ID (section 540). As depicted, the alert 500 indicates that Vendor X's UK transactions are experiencing a problem. The alert 500 may also include a section 520, indicating a change in the authorization rate within the identified data slice, and a section 550 indicates a quantity of the authorization rate decrease. The alert 500 may also indicate an estimated loss due to the anomaly (section 530). The alert 500 may also include a hyperlink 570 directing the user to a page where the data can be viewed and examined.

As described and depicted herein, using the methods and systems discussed herein, the analytics server can identify both sudden and gradual drops in any metric, such as the authorization rates across several dimensions: merchant, card brand, card country, bank, funding type, payment method, network tokens, and more.

Referring now to FIG. 5B, another example of an alert is presented. The alert 580 indicates that Vendor X is experiencing a long-term authorization rate degradation. The alert 580 may also include a hyperlink directing the user to an internal dashboard.

Figure 6:
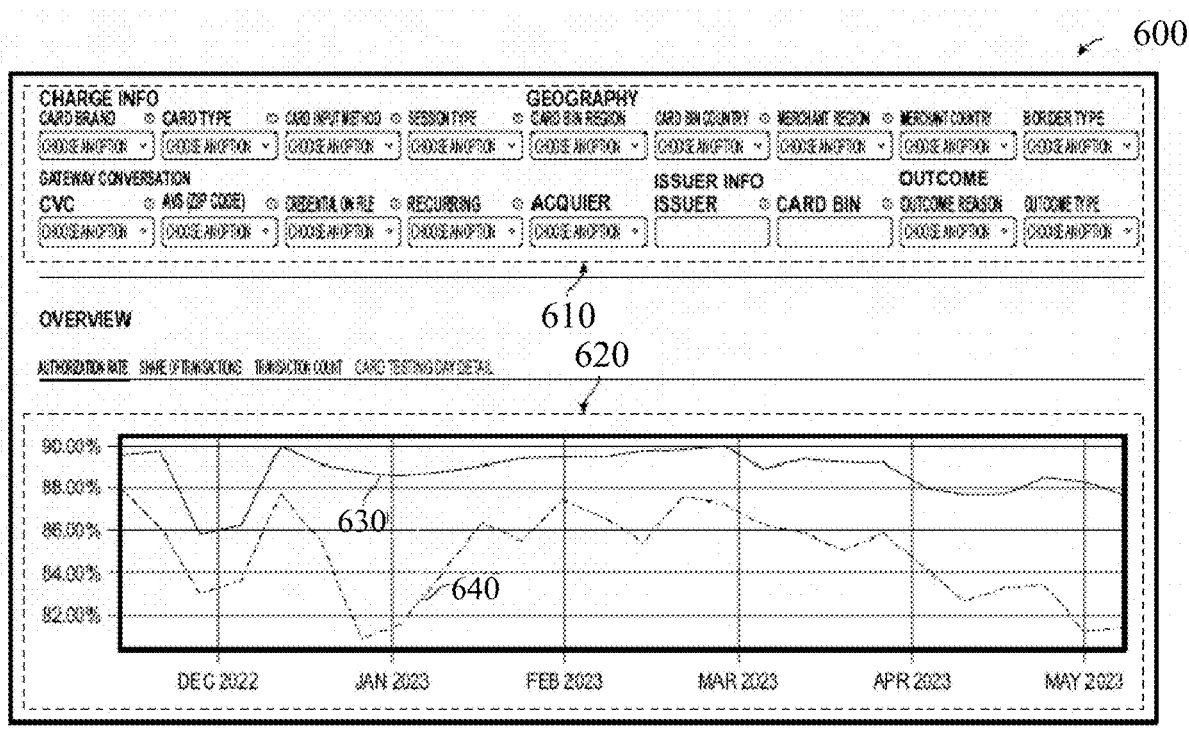

In some embodiments, the analytics server may populate a reporting tool, enabling users to drill down into various metrics (e.g., authorization, authentication, and/or fraud metrics) with interactive filters across various dimensions. In some embodiments, the data can be filtered such that other metrics (e.g., uplift) can be identified. Referring now to FIG. 6, a non-limiting example of an interactive dashboard presented or populated by the analytics server. The graphical user interface 600 may include various input elements 610 where the user can input one or more dimensions, allowing the computer model to slice the data accordingly. As a result, the analytics server may populate the graphical component 620 with the pertinent data (analyzed in accordance with the user's input). For instance, the graphical component may include a graph 630, which indicates authorization rate changes, and a graph 640, which indicates the authorization rate changes but excludes insufficient fund declines. The graphs depicted herein can be customized per user's inputs and selections of different criteria.

In some embodiments, the analytics server may determine that the user is interacting with the graphs (e.g., 630 and/or 640), such as hovering over the graphs. As a result, the analytics server may display the values (e.g., authorization rate percentages) of the area interacted by the user. In some embodiments, the values may correspond to real-time or near real-time data. For instance, instead of the graphical component 620 that displays the graphs 630-640 corresponding to a particular timeline (December 2022-May 2023), the analytics server may retrieve data corresponding to the identified data slice and display the data (e.g., authorization rate) in real-time. In this way, the user can see the authorization rate (or any other selected value) of the data slice and determine if the data slice is currently experiencing anomalous behavior.

Figure 7:
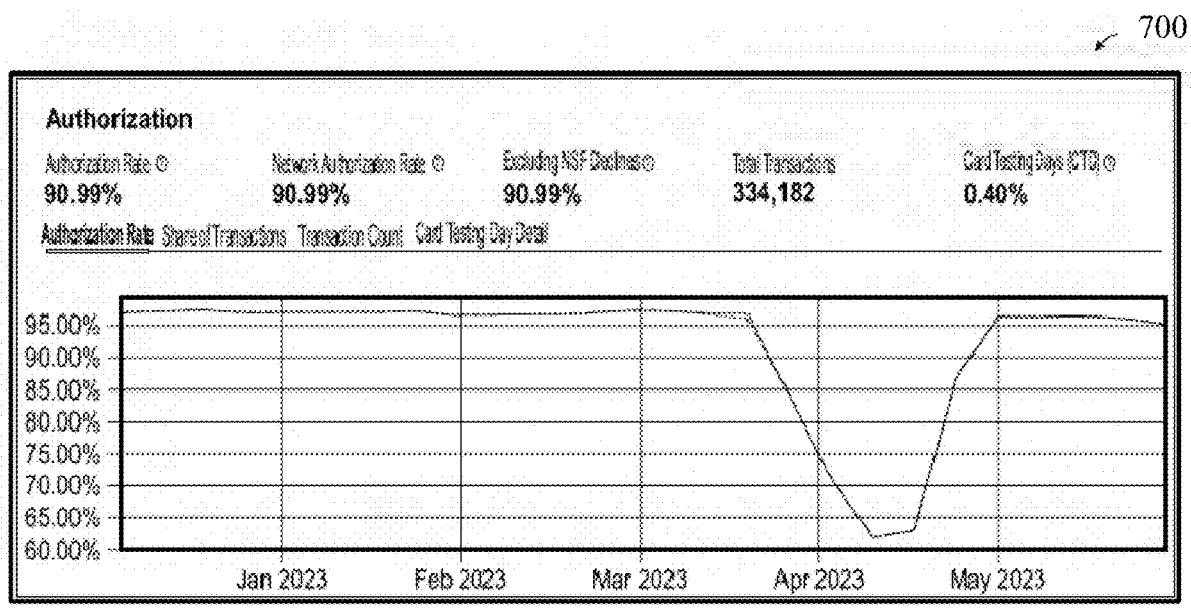

Referring to FIG. 7, chart 700 depicts another example of a graph illustrating a drop/change in a metric (e.g., authorization rate). The chart 700 illustrates that the authorization rate has changed from 95% to 60% in less than a month, thereby indicating that an action taken at that time (e.g., updating code) may have caused the change.

Figure 8:
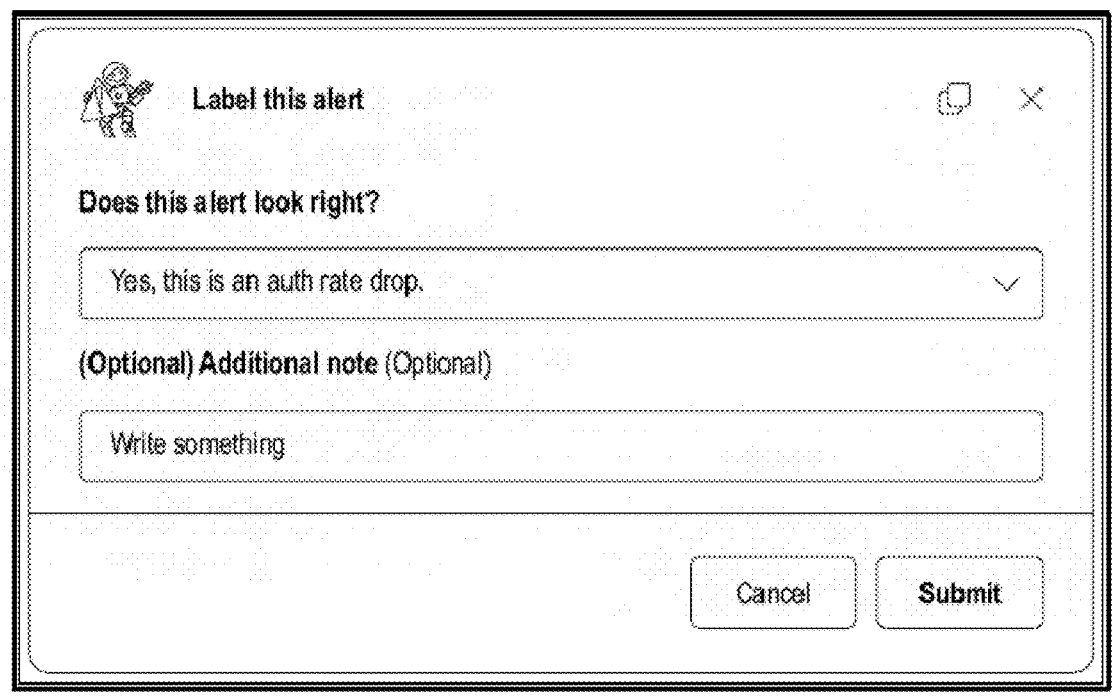

In order to improve the system, the analytics server may also present an input element requesting the user to label the alerts. The labeling may be used as a feedback loop to improve the operations of the computer model and the analytics server. For instance, as depicted in FIG. 8, the labeling request 800 may be displayed after an alert has been presented to a user. The user may interact with the input element depicted to identify whether the label is a true or false positive. The labeling request 800 may also include an input element configured to receive notes from the user. The notes may describe the problem with the alert and/or describe how the alert correctly/incorrectly illustrated any aspect of the data. The analytics server may collect the data, where a reviewer may review the notes and further analyze the methods and systems discussed herein. The collected data may also be ingested by the computer model discussed herein, such that the computer model can be re-calibrated if needed.

Figure 9:
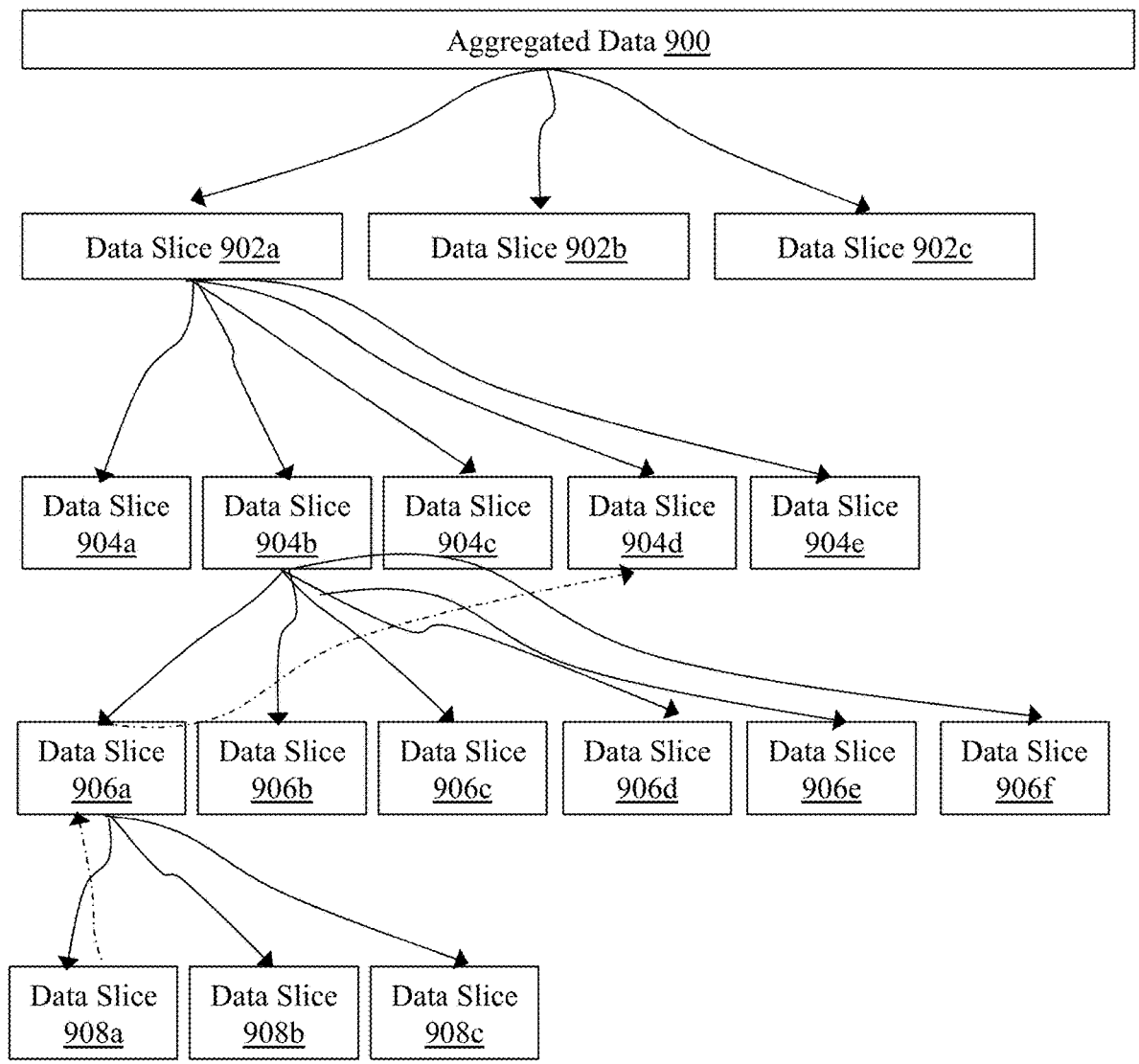
FIG. 9 illustrates a non-limiting example of a data slice hierarchy, according to an embodiment.

FIG. 9 illustrates a non-limiting example of how the computer model traverses a hierarchy of data slices. As depicted, the analytics server may retrieve the aggregated data 900. The aggregated data 900 may represent raw transaction data associated with the payment system (or at least a part of the payment system). The analytics server may then execute the computer model discussed herein to identify gradual drops in the authorization rate. The computer model may generate the data slices 902*a-c* (the first data slice discussed in the step 210 of FIG. 2). The computer model may then iteratively analyze the entropy values for each of the data slices 902*a-c*. If an entropy value satisfies a threshold, then the data slice exhibits anomalous behavior, and a notification can be transmitted to a computing device of a system administrator. For instance, the data slice 902*b* exhibits anomalous behavior, and the analytics server transmits the notification to the system administrator indicating the attributes used to identify the anomalous behavior (steps 242-4 of FIG. 2). Also, the computer model may no longer generate data slices base on the data slice 902*b*.

If a data slice does not satisfy the threshold, the computer model may continue generating a set of smaller data slices (step 250 of FIG. 2). For instance, the data slice 902*a* is further segmented into the data slices 906*a-e*. Entropy values of each of the data slices 906*a-e* can be identified (step 250 of FIG. 2), and an information gain value for each data slice 906*a-e* can be calculated (step 260 of FIG. 2). Based on an entropy value that satisfies a threshold and based on an information gain value that satisfies a threshold, the computer model may select the data slice 904*b* and segment the data slice 904*b* into the data slices 906*a-f*. The computer model may repeat the same process and further segment the data slice 906*a* into the data slices 908*a-c*. Though not shown, the same process may be repeated as many times as needed. Accordingly, the depicted hierarchy of data slices can be generated by the computer model.

Using the entropy value discussed herein, the computer model may determine that the data slice 908*a* is the smallest data slice that indicates an anomaly. However, the data slice 908*a* may include too few transactions. As a result, the computer model may iteratively combine the data slice 908*a* with each data slice 906*a-f* and redo the calculations discussed herein. As depicted, the computer model determines to combine the data slice 908*a* with the data slice 906*a*. The computer model may repeat this process until the largest data slice indicating anomalous behavior is identified (a combination of data slices 908*a*, 906*a*, and 904*d*). The analytics server may then train the computer model using the paths traversed and depicted and the attributes of each data slice analyzed. As a result, the computer model may predict the attributes to use to slice the data in future iterations.

Figure 10:
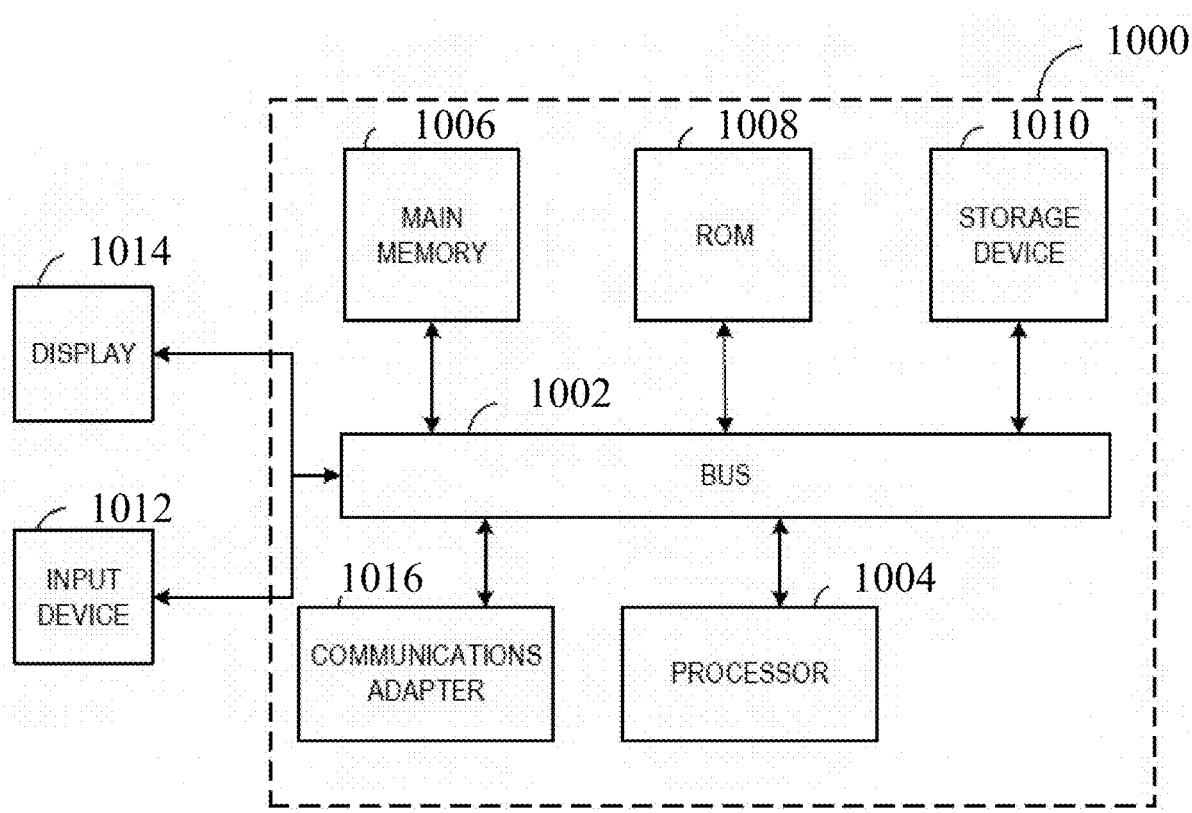
FIG. 10 illustrates a component diagram of a computing system suitable for use in the various implementations described herein, according to an embodiment.

FIG. 10 is a component diagram of an example computing system suitable for use in the various implementations described herein, according to an example implementation. One or more steps of the methods and processes discussed herein can be performed by the computing system depicted in FIG. 10.

The computing system 1000 includes a bus 1002 or other communication component for communicating information and a processor 1004 coupled to the bus 1002 for processing information. The computing system 1000 also includes main memory 1006, such as a RAM or other dynamic storage device, coupled to the bus 1002 for storing information, and instructions to be executed by the processor 1004. Main memory 906 can also be used for storing position information, temporary variables, or other intermediate information during execution of instructions by the processor 1004. The computing system 1000 may further include a ROM 1008 or other static storage device coupled to the bus 1002 for storing static information and instructions for the processor 1004. A storage device 1010, such as a solid-state device, magnetic disk, or optical disk, is coupled to the bus 1002 for persistently storing information and instructions.

The computing system 1000 may be coupled via the bus 1002 to a display 1014, such as a liquid crystal display, or active matrix display, for displaying information to a user. An input device 1012, such as a keyboard including alphanumeric and other keys, may be coupled to the bus 1002 for communicating information, and command selections to the processor 1004. In another implementation, the input device 1012 has a touch screen display. The input device 1012 can include any type of biometric sensor, or a cursor control, such as a mouse, a trackball, or cursor direction keys, for communicating direction information and command selections to the processor 904 and for controlling cursor movement on the display 1014.

In some implementations, the computing system 1000 may include a communications adapter 1016, such as a networking adapter. Communications adapter 1016 may be coupled to bus 1002 and may be configured to enable communications with a computing or communications network or other computing systems. In various illustrative implementations, any type of networking configuration may be achieved using communications adapter 1016, such as wired (e.g., via Ethernet), wireless (e.g., via Wi-Fi, Bluetooth), satellite (e.g., via GPS) pre-configured, ad-hoc, LAN, WAN, and the like.

According to various implementations, the processes of the illustrative implementations that are described herein can be achieved by the computing system 1000 in response to the processor 1004 executing an implementation of instructions contained in main memory 1006. Such instructions can be read into main memory 1006 from another computer-readable medium, such as the storage device 1010. Execution of the implementation of instructions contained in main memory 1006 causes the computing system 1000 to perform the illustrative processes described herein. One or more processors in a multi-processing implementation may also be employed to execute the instructions contained in main memory 106. In alternative implementations, hard-wired circuitry may be used in place of or in combination with software instructions to implement illustrative implementations. Thus, implementations are not limited to any specific combination of hardware circuitry and software.

The implementations described herein have been described with reference to drawings. The drawings illustrate certain details of specific implementations that implement the systems, methods, and programs described herein. However, describing the implementations with drawings should not be construed as imposing on the disclosure any limitations that may be present in the drawings.

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor, which, in some example implementations, may execute instructions stored, or otherwise accessed, via different areas of memory). Alternatively or additionally, the one or more processors may be structured to perform or otherwise execute certain operations independent of one or more co-processors.

In other example implementations, two or more processors may be coupled via a bus to enable independent, parallel, pipelined, or multi-threaded instruction execution. Each processor may be implemented as one or more general-purpose processors, ASICs, FPGAS, GPUs, TPUs, digital signal processors (DSPs), or other suitable electronic data processing components structured to execute instructions provided by memory. The one or more processors may take the form of a single core processor, multi-core processor (e.g., a dual core processor, triple core processor, or quad core processor), microprocessor, etc. In some implementations, the one or more processors may be external to the apparatus, for example, the one or more processors may be a remote processor (e.g., a cloud-based processor). Alternatively or additionally, the one or more processors may be internal or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the implementations might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile or non-volatile memories), etc. In some implementations, the non-volatile media may take the form of ROM, flash memory (e.g., flash memory such as NAND, 3D NAND, NOR, 3D NOR), EEPROM, MRAM, magnetic storage, hard discs, optical discs, etc. In other implementations, the volatile storage media may take the form of RAM, TRAM, ZRAM, etc. Combinations of the above are also included within the scope of machine-readable media. In this regard, machine-executable instructions comprise, for example, instructions and data, which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, may include any type of input device including, but not limited to, a keyboard, a keypad, a mouse, a joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions and implementation of the implementations without departing from the scope of the present disclosure as expressed in the appended claims.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What we claim is:

1. A method comprising:
   identifying, by a server, aggregated transaction data corresponding to a set of attributes for a set of transactions, each attribute having one or more corresponding values;
   executing, by the server, a computer model that is configured to:
      generate a first data slice using the aggregated transaction data and at least one attribute;
      calculate, for the first data slice, a first entropy value indicating a difference between one or more values corresponding to one or more attributes of the first data slice compared with a previous value for the same one or more attributes of the first data slice from a previous time window;
      when the first entropy value does not satisfy a threshold, generate a set of data slices using the first data slice;
      calculate a second entropy value for each data slice within the set of data slices;
      generate an information gain value based on the first entropy value and each second entropy value for the set of data slices;
      generate a second set of data slices using at least one data slice within the set of data slices that has an information gain value that satisfies an information gain threshold;
      when at least one data slice within the second set of data slices satisfies the threshold, iteratively combine the at least one data slice with another data slice of the second set of data slices to generate a combined data slice until the combined data slice has a respective entropy value that satisfies the threshold; and
   outputting, by the server, a notification of an anomaly associated with the aggregated transaction data comprising an identification of the combined data slice.

2. The method of claim 1, further comprising:
   displaying, by the server, an input element requesting a label associated with the anomaly.

3. The method of claim 1, further comprising:
   receiving, by the server, an indication of a false positive anomaly; and
   recalibrating, by the server, the computer model to revise at least one variable used by the computer model in accordance with an attribute of the false positive anomaly.

4. The method of claim 1, wherein the attribute of the first data slice is an authorization rate.

5. The method of claim 1, further comprising:
   training, by the server, the computer model or a second computer model using at least one of: the at least one attribute used to generate the first data slice, the first entropy value, the second entropy value associated with at least one data slice within the set of data slices, or the information gain value of at least one data slice, such that the computer model or the second computer model is configured to predict at least one of: the at least one attribute used to generate the first data slice, whether to generate the set of data slices, or whether to generate the second set of data slices.

6. The method of claim 5, wherein the computer model or the second computer model uses a boosted tree algorithm optimized using the information gain value of at least one data slice.

7. The method of claim 1, further comprising:
displaying, by the server, a graph indicating at least one value of at least one attribute of the combined data slice.

8. A non-transitory machine-readable storage medium having computer-executable instructions stored thereon that, when executed by one or more processors, cause the one or more processors to perform operations comprising:
identifying aggregated transaction data corresponding to a set of attributes for a set of transactions, each attribute having one or more corresponding values;
executing a computer model that is configured to:
generate a first data slice using the aggregated transaction data and at least one attribute;
calculate, for the first data slice, a first entropy value indicating a difference between one or more values corresponding to one or more attributes of the first data slice compared with a previous value for the same one or more attributes of the first data slice from a previous time window;
when the first entropy value does not satisfy a threshold, generate a set of data slices using the first data slice;
calculate a second entropy value for each data slice within the set of data slices;
generate an information gain value based on the first entropy value and each second entropy value for the set of data slices;
generate a second set of data slices using at least one data slice within the set of data slices that has an information gain value that satisfies an information gain threshold;
when at least one data slice within the second set of data slices satisfies the threshold, iteratively combine the at least one data slice with another data slice of the second set of data slices to generate a combined data slice until the combined data slice has a respective entropy value that satisfies the threshold; and
outputting a notification of an anomaly associated with the aggregated transaction data comprising an identification of the combined data slice.

9. The non-transitory machine-readable storage medium of claim 8, wherein the computer-executable instructions further cause the one or more processor to perform operations comprising:
displaying an input element requesting a label associated with the anomaly.

10. The non-transitory machine-readable storage medium of claim 8, wherein the computer-executable instructions further cause the one or more processor to perform operations comprising:
receiving an indication of a false positive anomaly; and recalibrating the computer model to revise at least one variable used by the computer model in accordance with an attribute of the false positive anomaly.

11. The non-transitory machine-readable storage medium of claim 8, wherein the attribute of the first data slice is an authorization rate.

12. The non-transitory machine-readable storage medium of claim 8, wherein the computer-executable instructions further cause the one or more processor to perform operations comprising:
training the computer model or a second computer model using at least one of: the at least one attribute used to generate the first data slice, the first entropy value, the second entropy value associated with at least one data slice within the set of data slices, or the information gain value of at least one data slice, such that the computer model or the second computer model is configured to predict at least one of: the at least one attribute used to generate the first data slice, whether to generate the set of data slices, or whether to generate the second set of data slices.

13. The non-transitory machine-readable storage medium of claim 12, wherein the computer model or the second computer model uses a boosted tree algorithm optimized using the information gain value of at least one data slice.

14. The non-transitory machine-readable storage medium of claim 8, wherein the computer-executable instructions further cause the one or more processor to perform operations comprising:
displaying a graph indicating at least one value of at least one attribute of the combined data slice.

15. A system comprising a processor configured to:
identify aggregated transaction data corresponding to a set of attributes for a set of transactions, each attribute having one or more corresponding values;
execute a computer model that is configured to:
generate a first data slice using the aggregated transaction data and at least one attribute;
calculate, for the first data slice, a first entropy value indicating a difference between one or more values corresponding to one or more attributes of the first data slice compared with a previous value for the same one more attributes of the first data slice from a previous time window;
when the first entropy value does not satisfy a threshold, generate a set of data slices using the first data slice;
calculate a second entropy value for each data slice within the set of data slices;
generate an information gain value based on the first entropy value and each second entropy value for the set of data slices;
generate a second set of data slices using at least one data slice within the set of data slices that has an information gain value that satisfies an information gain threshold;
when at least one data slice within the second set of data slices satisfies the threshold, iteratively combine the at least one data slice with another data slice of the second set of data slices to generate a combined data slice until the combined data slice has a respective entropy value that satisfies the threshold; and
output a notification of an anomaly associated with the aggregated transaction data comprising an identification of the combined data slice.

16. The system of claim 15, wherein the processor is further configured to:

display an input element requesting a label associated with the anomaly.

17. The system of claim 15, wherein the processor is further configured to:
receive an indication of a false positive anomaly; and
recalibrate the computer model to revise at least one variable used by the computer model in accordance with an attribute of the false positive anomaly.

18. The system of claim 15, wherein the attribute of the first data slice is an authorization rate.

19. The system of claim 15, wherein the processor is further configured to:
training the computer model or a second computer model using at least one of: the at least one attribute used to generate the first data slice, the first entropy value, the second entropy value associated with at least one data slice within the set of data slices, or the information gain value of at least one data slice, such that the computer model or the second computer model is configured to predict at least one of: the at least one attribute used to generate the first data slice, whether to generate the set of data slices, or whether to generate the second set of data slices.

20. The system of claim 15, wherein the processor is further configured to:
display a graph indicating at least one value of at least one attribute of the combined data slice.

* * * * *